AUTOMATIC SWITCHING SYSTEM HAVING REDUCED DELAY TIMES

Filed March 15, 1967

INVENTOR
JOSEPH P. FIELD
BY
Warren H. [signature]
ATTORNEY

3,517,134
AUTOMATIC SWITCHING SYSTEM HAVING REDUCED DELAY TIMES

Joseph P. Field, Hato Rey, Puerto Rico, assignor to International Telephone and Telegraph Corporation, a corporation of Delaware Filed Mar. 15, 1967, Ser. No. 623,420
Int. Cl. H04q 3/42
U.S. Cl. 179—18 7 Claims

ABSTRACT OF THE DISCLOSURE

A switching network has auxiliary crossbar switches for giving access to registers and senders. A plurality of registers are individually associated with the verticals and a pool of senders are common to all of the horizontals of these auxiliary switches. When in use, the registers and senders are directly connected to each other via crosspoints of the switch, thus allowing them to exchange information directly and without requiring a continued intervention of a marker.

This invention relates to control means for automatic switching networks and more particularly to improvements for reducing the holding time of dial pulse processing equipments used in said systems.

Briefly, automatic switching networks are generally controlled in response to a data processing of digital information, which information is subscriber sent dial pulses. The data processing is accomplished by a number of devices such as those usually called registers, senders, or the like. These devices are only required during very short intervals while the connections are being established; therefore, it is conventional for the other switch controlling equipments to use them on a time sharing basis. Thus, accessing equipment must be provided to select the data processing devices and connect them to the switch control equipment during the time sharing interval while such devices are actually in use. For convenience of expression, the term "holding time" is used to describe the time while the devices are in use, and the term "delay time" is used to describe the period while the system is standing and waiting to gain access to these devices.

The combined duration of the holding and delay time interval is quite important. First, the number of data processing devices which must be provided increases as a function of the holding itme. Second, the subscriber's convenience decreases as a function of the increase of the combined holding and delay time. Also, other network control equipment may be reduced in quantity and complexity if the holding and delay times are reduced. For example, fewer markers may be required if the registers and senders are able to operate independently sooner and for longer periods of time.

Accordingly, an object of this invention is to reduce the total time required to process data in an automatic switching system. Another object is to provide new and improved accessing and holding equipments for reducing the delay time.

In keeping with an aspect of this invention, these and other objects are accomplished by means of registers and senders which are permanently associated with auxiliary crossbar switches. Thus, there is a set of switching links which are always dedicated to the interconnection of a specific register and the individual ones of a pool of senders. Since these links are necessarily idle and available if the associated registers and senders are idle and available, there is no delay in getting a connection. Moreover, the dedication between registers, senders, and specific links enables simpler, quicker, and more precise trouble shooting and routine maintenance.

The above mentioned and other features of this invention and the manner of obtaining them will become more apparent, and the invention itself will be best understood by reference to the following description of an embodiment of the invention taken in conjunction with the accompanying drawings, in which.

Figure 1:
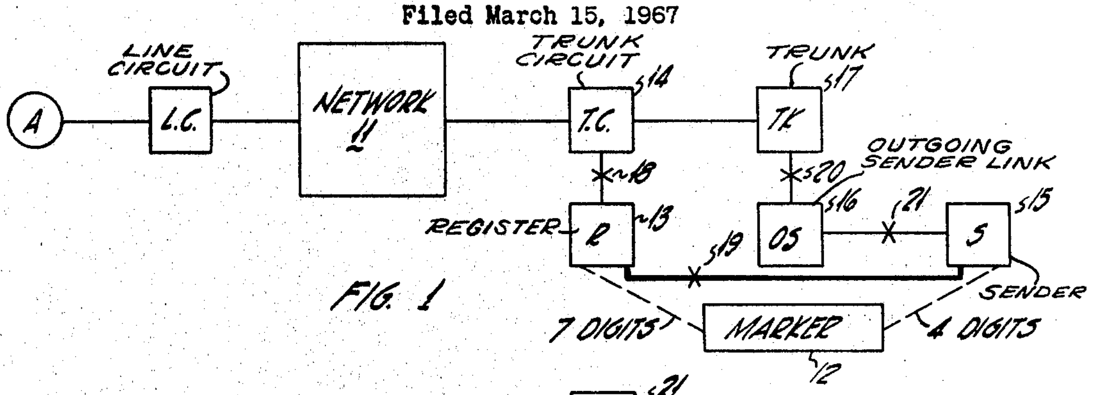
FIG. 1 is a block diagram which illustrates the problems involved and the inventive solutions therefor.

FIG. 1 shows a switching network 11 of any suitable design. However, in the preferred embodiment of the invention, this network may take the form shown in a copending application entitled "Automatic Switching Matrix," Ser. No. 430,136, filed Feb. 3, 1965, by Erwin, Field, and Mahood, and assigned to the assignee of this invention, now Pat. No. 3,441,677. The object of such a switching network is, of course, to interconnect various pieces or kinds of equipment, two kinds of which are here generically called "Lines" and "Trunks." Thus, the object of this generically simple network is to be interconnect one line which is demanding services and one trunk which is capable of giving the demanded service. Those skilled in the art will readily perceive many types of equipments, other than lines and trunks, which may also be interconnected by a network, such as this.

The "Lines" are connected to one side of the network via individual line circuits "LC." The "Trunks" are connected to the other side of the network, via trunk circuits "TC." The network is controlled by a suitable number of common control devices, such as marker 12. From time to time, a register 13 may be connected into the system in any of many different modes. It is here shown as having been connected via a trunk circuit 14. To explain the invention, it may be assumed that the marker controls the operation in any well known manner responsive to dial pulse signals sent by a subscriber at station A through network 11 and trunk circuit 14 to the register 13.

The remainder of FIG. 1 does not represent any specific system. Instead, it shows a number of optional associations which explain some of the delay factors that enter into network design considerations.

One way of controlling a switching system is to store a given number (such as seven) of digits in the register. Then the digits are transferred to the marker. Next, the marker calls in a sender 15 which produces control signals suitable for driving the switching equipment. There may or may not be a translation of the control signals between the forms stored at 13 and sent at 15. Usually, the first three digits are for routing, and the last four are for switch control; therefore, at least four digits are sent from the marker 12 to the sender 15.

The sender 15 might seize an outgoing sender link 16 which selects a trunk 17 associated with trunk circuit 14 and forwards the sender outpulsing thereto. The "X" marks 18–21 represent switching crosspoints where selections may be made to complete the described control functions. Each of these crosspoints represents a decision, and that in turn causes a delay.

Delay may also occur at many other points in the described system. First, the network 11 must seize the register 13 and return dial tone to subscriber A. Second, the register must call in and communicate with the marker 12. Third, the marker must call in and communicate with the sender 15. Fourth, the sender must associate itself with the proper trunk 17 and send out the stored control signals. Each of these operations takes time, and the cumulative time may amount to an unreasonable delay.

According to the invention, signaling is expedited and delays are avoided by associating the register 13 and sender 15 directly through a specific crosspoint linking circuit 19. Thus, there is no delay while the marker first selects and then transfers stored digits to the sender. The register provides all of the outpulsing signal paths through its original connection 18. Hence, means are provided for eliminating the time required to select and complete the paths represented by the crosspoints 20, 21. Since the register and sender communicate directly, there is no need to store all digits in either the register or the marker before making a bid for a sender. Instead, the register may demand a sender, transfer information, and begin to outpulse while the calling subscriber is still dialing. For example, this bid for a sender may be made after three to five digits of a seven digit number or eight to nine digits of an eleven digit number have been received.

Figure 2:
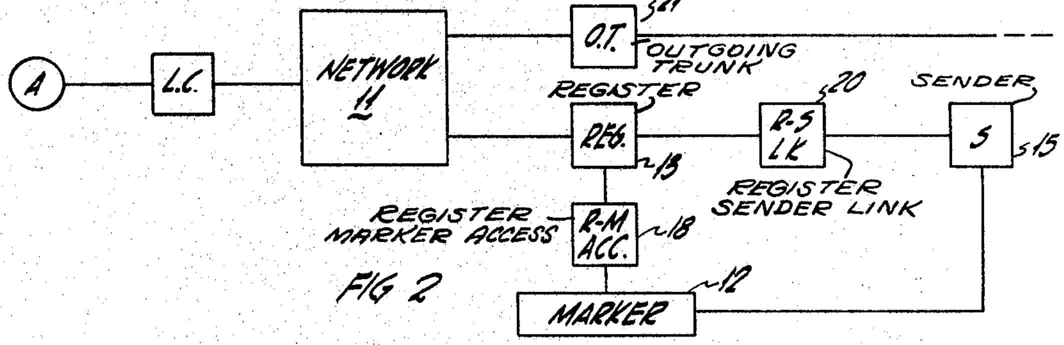
FIG. 2 is a block diagram showing an incorporation of the principles of the invention in a telephone switching system.

FIG. 2 shows a block diagram of an exemplary switching system constructed according to the invention. The subscriber A may seize the register 13 via a path directly through the network 11. The register 13 stores at least three—and probably more—digits, and then completes a path through a register-marker access switch 18 to the marker 12.

The marker makes a routing decision based on the first three digits which it receives from the register 13. If the first three digits are those of the local office, they may be canceled. The last four digits are used to set the local network 11. If the first three digits are those of a distant office, the marker 12 operates the network 11 to select an appropriate outgoing trunk circuit 21. The remaining digits are sent to set the switches in the distant office.

The marker 12 also sets a register-sender link switch 20 to interconnect a selected sender with the specific register that is bidding for service. The register-marker access switch 18 releases, and the marker goes on to serve some other call. Thereafter, the register 13 and sender 15 communicate directly with each other via a link in switch 20.

Figure 3:
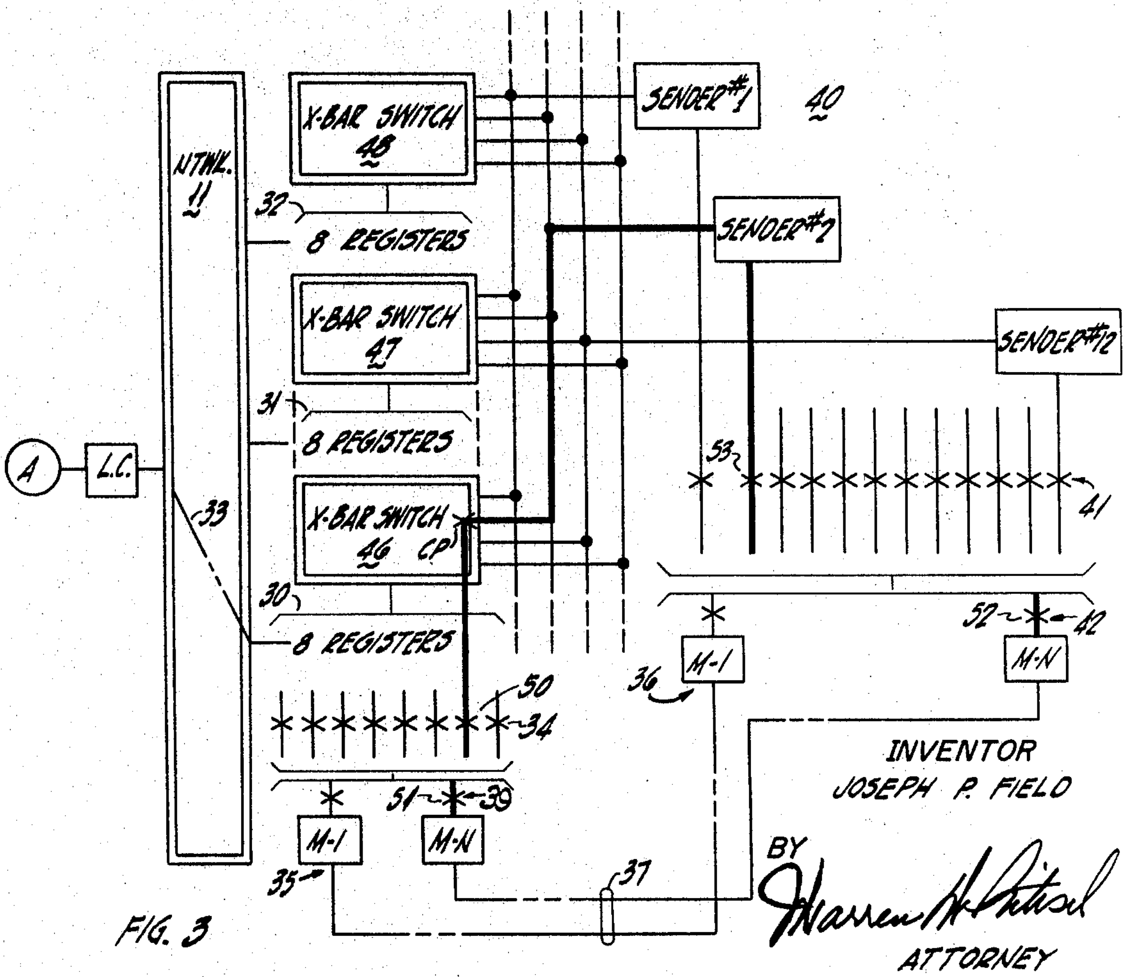
FIG. 3 is a further block diagram showing how a specific register may be associated through a specific crossbar switch to a specific sender to reduce the access and holding time of the register, sender, and marker.

FIG. 3 shows the details of how this is accomplished. The subscriber line A, line circuit LC, and network 11 are the same as those described above in connection with the preceding figures. The network 11 is here drawn as having access to any one of twenty-four registers in three groups 30–32. Each register has switching facilities 34 for connecting itself to the markers.

FIG. 3 also shows two markers 35 and uses the notation M–N to indicate that any suitable number of markers may be provided. These markers have access to the senders; therefore, they are shown as having second appearances at 36. However, the lines 37 indicate that these two marker appearances are parts of the same overall circuits which form the same markers. These markers are provided with facilities 39 for selecting any group of registers.

It should be understood that the register groups 31, 32 and markers 35 have switching facilities (not shown but similar to 34, 39) for interconnecting any of the registers with any of the markers.

A pool of twelve senders, shown at 40, are shared by the twenty-four registers. Each sender has switching facilities 41 for completing a connection which makes a bid for the markers 36. Likewise, the markers 36 have facilities 42 for completing a connection with the senders 40.

The registers are connected to the verticals on individually associated crossbar switches 46–48. By inspection of the drawing, it should be apparent that each of the groups of registers have access to one and only one of the crossbar switches. Thus, for example, register group 30 may obtain a connection via the switch 46 but not via the switches 47 or 48. Register groups 31, 32 may use switches 47, 48, respectively, in a similar manner.

The senders have individual appearances on the horizontal of each of the switches 46–48. Thus, any register has access through its individually associated crossbar switch to any sender in the common pool of senders 40.

To expedite the transmission of data between the registers and senders, each register is coupled to two verticals of the crossbar switch. Each vertical on a crossbar switch conventionally has six contacts. Therefore, if two verticals are allotted to each register appearance, it should be apparent that twelve wires are extended between any register and sender when one of the switches 46–48 completes a connection.

The circuit operates this way. A calling subscriber removes a hand set and a network path (such as 33) is completed in a known manner to any idle register. Here, it is assumed that the path 33 extends to the seventh register in group 30. Then the register returns dial tone. The calling subscriber responds by dialing the directory number of the called subscriber.

After a suitable number (such as four) of the directory number digits have been received, the register closes switch 50 to bid for a sender.

The marker (such as M–N), which is free and ready to serve this call, closes a switch 51 and any suitable means interconnects the switches 50, 51. The marker M–N analyzes the routing digits (usually the first three or office code digits) and makes a decision as to the path which is required. If these digits indicate that a trunk is required to a distant office, it is seized via network 11. If not, these routing digits are generally canceled.

The marker M–N closes contacts 52 to bid for a sender. If Sender #2 is the one which is idle and ready for this call, contacts 53 are closed. A crosspoint CP is operated in crossbar switch 46 to complete the path shown in FIG. 3 by a heavily inked line. The marker applies a signal through switch 51 which it detects through switch 53 when the path is completed and there is continuity from a register to a sender. As soon as such continuity appears, the marker M–N drops out, leaving the register and sender associated with each other.

The register transfers the appropriate signals to the sender. The sender converts the signals—with or without translation—into a form which may be used by the receiving equipment. Then, the sender transmits such converted signals through the register to the properly connected equipment. There is no need for a continuous marker intervention.

The sender-register association completed through switch 46 remains in the condition indicated by the heavily inked line in FIG. 3 until either the necessary digits have been sent or a timer has timed out. If the timer times out, the calling subscriber receives a busy tone which causes him to hang up and place a new call. An example of when such a timing-out might occur, is the case where a subscriber sends five digits and then fails to send the last two or six digits. Essentially, this subscriber failure produces little or no adverse effects which do not occur regularly, as in step-by-step offices where digits are also set out at a subscriber controlled speed.

The advantages of the invention stem primarily from the close association between the registers and specific ones of the crossbar switches and between these switches generally and a pool of senders. If a register bids for a sender, a switch is standing and waiting, available to complete the connection regardless of the sender which is used. There is no delay while a search is made to find an available switch. Also, the outpulsing begins at once, while the subscriber is still dialing. There is no wait for the subscriber to complete the entire dialing of a directory number beyond that wait which a traffic study indicates as necessary or desirable based upon subscriber habits.

Moreover, if trouble should occur, the register may report it directly in terms of crosspoint location because a particular crosspoint in the switch 46, for example, is individual to a particular register and a particular sender. There is no need to call in a marker for identifying the register, sender and crosspoint which are the source of trouble.

Furthermore, the direct communication between the register and sender frees the marker quicker. For example, one exemplary system using the invention was able to simultaneously process data for up to ten calls. Another, prior art system of comparable size and equipment was, for example, limited to the simultaneous processing of four calls.

While the principles of the invention have been described above in connection with specific apparatus and applications, it is to be understood that this description is made only by way of example and not as a limitation on the scope of the invention.

I claim:

1. A switching system comprising a network for selectively extending paths from entrance points on one side of the network to exit points on the other side of the network, data processing means comprising a plurality of registers connected to certain of said exits, said registers being arranged in groups, a plurality of crossbar switches, one of said switches being individually associated with each of said groups of registers, a pool of senders common to all of said switches, and means for temporarily connecting any one of said registers with any one of said senders via the crossbar switch individually associated with the group of registers including said one register.

2. The switching system of claim 1 wherein said data represents the directory number of a telephone subscriber, and common control means for controlling said network responsive to a receipt of said data from a calling subscriber station, and means in said register responsive to a receipt of a predetermined number of digits in a directory number for requesting said common control means to make said temporary connection.

3. The switching system of claim 2 and means in said common control circuit for testing said temporary connection for continuity from said one register to said one sender, and means responsive to a detection of such continuity for releasing said common control circuit.

4. The switching system of claim 1 wherein said crossbar switches comprise a plurality of horizontal and vertical multiples, each of said registers being connected to two of said vertical multiples on said individual associated switch, each of said senders being connected to a horizontal multiple on each of said switches, said temporary connection comprising an operation of a crosspoint at the intersection of a selected number of the two multiple verticals associated with a register and a horizontal multiple associated with a sender.

5. The system of claim 4 and means for recording trouble in terms of the location of said operated crosspoint.

6. The switching system of claim 1 wherein said data represents the directory number of a telephone subscriber, means for controlling said network responsive to a receipt of said data from a calling subscriber station, means responsive to receipt of a first part of said directory number for making a selected one of said temporary connections, means for transferring a further part of said directory number of said sender while the remainder of said directory number is being received, and means in said sender for immediately outpulsing said further part and remainder of said directory number through said register to said network.

7. The system of claim 6 and means for releasing said temporary connection if said remainder of said directory number is not received within a predetermined period of time.

References Cited

UNITED STATES PATENTS 3,290,446 12/1966 Ceonzo et al. ------- 179—18.211

WILLIAM C. COOPER, Primary Examiner